(12) United States Patent
Hornman et al.

(10) Patent No.: US 10,690,790 B2
(45) Date of Patent: Jun. 23, 2020

(54) METHOD AND SYSTEM FOR RECORDING SEISMIC SIGNALS

(71) Applicant: SHELL OIL COMPANY, Houston, TX (US)

(72) Inventors: Johan Cornelis Hornman, Rijswijk (NL); Albena Alexandrova Mateeva, Houston, TX (US); Jorge Luis Lopez, Bellaire, TX (US)

(73) Assignee: SHELL OIL COMPANY, Houston, TX (US)

( * ) Notice: Subject to any disclaimer, the term of this patent is extended or adjusted under 35 U.S.C. 154(b) by 371 days.

(21) Appl. No.: 15/545,918

(22) PCT Filed: Jan. 25, 2016

(86) PCT No.: PCT/US2016/014712
§ 371 (c)(1),
(2) Date: Jul. 24, 2017

(87) PCT Pub. No.: WO2016/123015
PCT Pub. Date: Aug. 4, 2016

(65) Prior Publication Data
US 2018/0024260 A1    Jan. 25, 2018

Related U.S. Application Data

(60) Provisional application No. 62/107,884, filed on Jan. 26, 2015.

(51) Int. Cl.
*G01V 1/00*    (2006.01)
*G01V 1/42*    (2006.01)

(52) U.S. Cl.
CPC ............... *G01V 1/003* (2013.01); *G01V 1/42* (2013.01)

(58) Field of Classification Search
CPC .................................. G01V 1/003; G01V 1/42
See application file for complete search history.

(56) References Cited

U.S. PATENT DOCUMENTS 5,730,219 A * 3/1998 Tubel ..................... E21B 47/10
                                                        166/250.1
6,065,538 A * 5/2000 Reimers ................. E21B 23/03
                                                        166/250.01
(Continued)

FOREIGN PATENT DOCUMENTS

EP    0780701 A1 *    6/1997    ............ G01V 1/003
EP    0780701 A1      6/1997
(Continued)

OTHER PUBLICATIONS

International Search Report and Written Opinion received for PCT Patent Application No. PCT/US2016/014712, dated May 4, 2016, 10 pages.
(Continued)

*Primary Examiner* — Krystine E Breier (57) ABSTRACT

A first stationary seismic receiver array is provided in a first non-vertically directed first borehole section of a first array of non-vertically directed first borehole sections, and a second stationary seismic receiver array is provided in a second non-vertically directed first borehole section of the first array of non-vertically directed first borehole sections. A seismic source assembly is moved axially through a first non-vertically directed second borehole section from at least a first position to a second position of a plurality of first borehole positions along a length of the first non-vertically directed second borehole section. The seismic source assembly contains a repeatable seismic source, which is activated when the seismic source assembly is in the first position and when the seismic source assembly is in the second position. First and second shots of seismic signals are recorded with
(Continued)

at least each of the first and second stationary seismic receivers.

19 Claims, 2 Drawing Sheets

(56) References Cited

U.S. PATENT DOCUMENTS

| | | | | |
|---|---|---|---|---|
| 6,662,899 | B2* | 12/2003 | Norris | G01V 1/40 |
| | | | | 166/250.01 |
| 7,102,961 | B2* | 9/2006 | Curtis | G01V 1/003 |
| | | | | 181/106 |
| 9,316,755 | B2* | 4/2016 | Guigne | G01V 1/005 |
| 10,120,104 | B2* | 11/2018 | Roy | E21B 47/14 |
| 2011/0079461 | A1* | 4/2011 | Allen | G01V 1/003 |
| | | | | 181/106 |
| 2012/0092960 | A1* | 4/2012 | Gaston | E21B 47/101 |
| | | | | 367/35 |
| 2014/0092708 | A1 | 4/2014 | Cotton et al. | |
| 2014/0328139 | A1 | 11/2014 | Minto et al. | |
| 2017/0285204 | A1* | 10/2017 | Hornman | G01V 1/36 |
| 2018/0217285 | A1* | 8/2018 | Walters | G01V 1/303 |

FOREIGN PATENT DOCUMENTS

| | | |
|---|---|---|
| WO | 2013090544 A1 | 6/2013 |
| WO | 2016044060 A1 | 3/2016 |

OTHER PUBLICATIONS

Meunier et al., "Reservoir monitoring using permanent sources and vertical receiver antennae: The Céré-la-Ronde case study", The Leading Edge, Jun. 2001, pp. 622-629.

Drijkoningen, "Introduction to Reflection Seismology", Chapter 6 of TUDelft University B.Sc. course, Oct. 2011, pp. 113-121.

Mateeva et al., "Distributed acoustic sensing for reservoir monitoring with vertical seismic profiling", Geophysical Prospecting, vol. 62, pp. 679-692, 2014.

"SeisMovie: Continuous High-resolution Reservoir Monitoring", CGG Veritas Brochure, Jan. 18, 2008, 2 pages.

Baria et al., "Further development of a high-frequency seismic source for use in boreholes", Geophysical Prospecting, vol. 37, pp. 31-52, 1989.

Rechtien et al., "A high-frequency sparker source for the borehole environment", Geophysics, vol. 58, pp. 660-669, 1993.

Heigl et al., "Development of a downhole sparker source with adjustable frequencies", SEG Annual Meeting 2012 Expanded Abstracts, pp. 1-5, 2012.

Nalonnil et al., "Next Generation Borehole Seismic: Dual-Wavefield Vibrator System" International Petroleum Technology Conference, Mar. 26-28, 2013.

Cotton et al., "Duel-Depth Hydrophones for Ghost Reduction in 4D Land Monitoring", SEG Annual Meeting extended abstracts, Las Vegas, 2012, pp. 1-5.

* cited by examiner

METHOD AND SYSTEM FOR RECORDING SEISMIC SIGNALS

CROSS REFERENCE TO EARLIER APPLICATION

The present application is a National Stage (§ 371) application of PCT/US2016/014712, filed Jan. 25, 2016, which claims priority benefits of U.S. Provisional Application No. 62/107,884, filed Jan. 26, 2015, the disclosure of which is incorporated by reference herein.

FIELD OF THE INVENTION

The present invention relates to a method of and a system for recording seismic signals from an earth formation.

BACKGROUND OF THE INVENTION

There is a permanent need in the industry of exploration and production of oil and gas from earth formations for monitoring and surveillance of operations involving the earth formations. Particularly, it has many benefits to be able to monitor changes in hydrocarbon reservoirs within the earth formation over time which may be introduced as a result of producing hydrocarbon fluids from the hydrocarbon reservoirs and/or as a result of injecting fluids into the hydrocarbon reservoirs.

In one monitoring system commercialized by CGG, sometimes referred to by the name SeisMovie™, buried seismic source and receiver installations are employed, which has the advantage that sources and receivers can be positioned below weathering layers which are subject to seasonal variation. This system is therefore suitable for 4D monitoring of a weak 4D signal over long periods of time spanning several seasonal cycles. Reference is made to a brochure from CGG Veritas titled "SeisMovie, continuous high-resolution reservoir monitoring." The sources are piezoelectric vibrator sources positioned within vertical boreholes.

A drawback of the known SeisMovie™ system is high cost as multiple seismic sources are permanently buried. Furthermore, the burying of the sources and the receiver network is associated with a large environmental imprint.

SUMMARY OF THE INVENTION

In accordance with a first aspect of the present invention, there is provided a method of recording seismic signals, comprising the steps of:

providing a first array of non-vertically directed first borehole sections in an earth formation beneath an earth surface, comprising at least a first non-vertically directed first borehole section and a second non-vertically directed first borehole section;

providing a second array of non-vertically directed second borehole sections in said earth formation, comprising at least a first non-vertically directed second borehole section;

providing a first stationary seismic receiver array in the first non-vertically directed first borehole section, comprising at least one first stationary seismic receiver in a first receiver location, and providing a second stationary seismic receiver array in the second non-vertically directed first borehole section comprising at least one second stationary seismic receiver in a second receiver location;

providing a seismic source assembly comprising a repeatable seismic source;

moving the seismic source assembly axially through the first non-vertically directed second borehole section from at least a first position to a second position of a plurality of first borehole positions along a length of the first non-vertically directed second borehole section;

activating the repeatable seismic source when the seismic source assembly is in the first position and recording a first shot of seismic signals with at least each of the first and second stationary seismic receivers; and activating the repeatable seismic source when the seismic source assembly is in the second position and recording a second shot of seismic signals with at least each of the first and second stationary seismic receivers;

wherein activating the repeatable seismic source causes seismic waves to propagate through the earth formation and wherein each of the first and second stationary seismic receivers is sensitive to vertically propagating seismic waves and wherein the first and second shots of seismic signals are measured representations of said seismic waves interacting with the first and second stationary seismic receivers.

In accordance with a second aspect of the invention, there is provided a system for recording seismic signals, comprising:

a first array of non-vertically directed first borehole sections in an earth formation beneath an earth surface, comprising at least a first non-vertically directed first borehole section and a second non-vertically directed first borehole section;

a second array of non-vertically directed second borehole sections in said earth formation, comprising at least a first non-vertically directed second borehole section;

a first stationary seismic receiver array in the first non-vertically directed first borehole section, comprising at least one first stationary seismic receiver in a first receiver location, and a second stationary seismic receiver array in the second non-vertically directed first borehole section comprising at least one second stationary seismic receiver in a second receiver location;

a seismic source assembly comprising a repeatable seismic source;

a motor operably connected to the seismic source assembly for moving the seismic source assembly axially through the first non-vertically directed second borehole section from at least a first position to a second position of a plurality of first borehole positions along a length of the first non-vertically directed second borehole section;

a source controller capable of activating the repeatable seismic source when the seismic source assembly is in the first position and when the seismic source assembly is in the second position; and a data recorder operably connected to the first and second stationary seismic receivers to record seismic signals from the first and second stationary seismic receivers;

wherein activating the repeatable seismic source causes seismic waves to propagate through the earth formation and wherein each of the first and second stationary seismic receivers is sensitive to vertically propagating seismic waves whereby said seismic signals are caused by said seismic waves interacting with the first and second stationary seismic receivers.

The invention will be further illustrated hereinafter by way of example only, and with reference to the non-limiting drawing.

BRIEF DESCRIPTION OF THE DRAWING

These figures are not to scale. For the purpose of this description, identical reference numbers used in different figures refer to similar components.

DETAILED DESCRIPTION OF THE INVENTION

The person skilled in the art will readily understand that, while the invention is illustrated making reference to one or more a specific combinations of features and measures, many of those features and measures are functionally independent from other features and measures such that they can be equally or similarly applied independently in other embodiments or combinations.

A method and system are proposed for recording seismic signals. A first stationary seismic receiver array is provided in a first non-vertically directed first borehole section comprised in a first array of non-vertically directed first borehole sections, and a second stationary seismic receiver array is provided in a second non-vertically directed first borehole section of the first array of non-vertically directed first borehole sections. The first array of non-vertically directed first borehole sections is provided in an earth formation beneath an earth surface.

Each of the aforementioned borehole section may have been excavated along a trajectory. Each of the aforementioned borehole sections has an axial direction, which is parallel to the trajectory along which the borehole has been excavated, and a transverse direction which is perpendicular to the axial direction in any given point with in the borehole section. The "direction" of aforementioned borehole sections corresponds to the orientation of the axial direction. In the present patent application the term "longitudinal" has the same meaning as "axial" and both terms can be interchangeably used.

A seismic source assembly is moved axially through a first non-vertically directed second borehole section, from at least a first position to a second position of a plurality of first borehole positions along a length of the first non-vertically directed second borehole section. A motor may be provided operably connected to the seismic source assembly for this purpose. The first non-vertically directed second borehole section belongs to a second array of non-vertically directed second borehole sections provided in the earth formation. The second array of non-vertically directed second borehole sections does not coincide with the first array of non-vertically directed first borehole sections.

The seismic source assembly contains a repeatable seismic source, which is activated when the seismic source assembly is in the first position and again when the seismic source assembly is in the second position. Activating the repeatable seismic source causes seismic waves to propagate through the earth formation. Each of the first and second stationary seismic receivers is preferably sensitive to vertically propagating seismic waves, and shots of seismic signals are recorded with at least each of the first and second stationary seismic receivers, for each time the seismic source is activated. These shots of seismic signals are measured representations of said seismic waves interacting with the first and second stationary seismic receivers.

As the first borehole sections belonging to the first array of non-vertically directed first borehole sections are not vertical, it can be relatively cheap to supply these borehole sections with seismic receiver arrays such that a plurality of stationary seismic receivers within the seismic receiver arrays have a geographical lateral spread. By having at least two of such first borehole sections, a two-dimensional grid of buried seismic receivers can be established without having to drill a hole for each seismic receiver or having to excavate a large area of terrain.

Moreover, a single seismic source assembly suffices as this seismic source assembly has a repeatable seismic source and can be moved through one of the non-vertically directed second borehole sections from one position to the next. The seismic source assembly may be retrievable, so that it can be moved through additional non-vertically directed second borehole sections that are comprised in the second array of non-vertically directed second borehole sections, to provide a two-dimensional pattern of source positions in a given seismic survey. Thus fewer seismic sources are permanently occupied than is the case in the SeisMovie™ concept as described in the CGG Veritas brochure. Moreover, fewer boreholes need to be produced. Hence, the upfront investment can be much lower.

In the context of the present disclosure, the term "seismic" refers to acoustic waves and related signals in the seismic frequency range. The seismic frequency range typically includes frequencies upto about 1 kHz, but does not include frequencies above 1 kHz. For the purpose of the present disclosure, the upper limit of the seismic frequency range may suitably be defined as 800 Hz. In a narrower definition of seismic frequency range, the upper limit may be defined at 250 Hz, and in an even more narrow definition the upper limit may be defined at 200 Hz and in the most narrow definition upper limit may be defined at 150 Hz. The lower limit of the seismic frequency range can be arbitrarily close to zero, but in practice the lower limit of the seismic frequency range for active sources may be found at for instance 0.1 Hz or 1 Hz.

In the context of the present disclosure, the term "repeatable" in "repeatable seismic source" primarily indicates that a single seismic source can be activated a plurality of times without a need to retrieve the seismic source from the second array of non-vertically directed second borehole sections. However, preferred embodiments employ a repeatable seismic source which is capable of repeatedly emitting seismic waves that have similar properties such as shape and/or duration. The more the emitted wave fields created by successive activations of the repeatable seismic source resemble one another, the less data processing is required (data matching) and/or the smaller changes in the earth formation that can be detected. However, it should be recognized that no exact criterion for repeatability can be specified as it will depend on the required resolution and/or the amount of data processing that is considered to be acceptable.

In the present context, dynamite is not considered to be a repeatable seismic source, but piezoelectric vibrator sources and sparker sources are considered to be examples of repeatable seismic sources.

The term "stationary" in "stationary seismic receiver array" means that the seismic receiver array can remain in a fixed location for the duration of at least the seismic source assembly being activated in a plurality of first borehole positions along the length of the first non-vertically directed second borehole section. If the stationary seismic receiver arrays are as long as the non-vertically directed first borehole sections, it won't be needed to move the stationary seismic receiver arrays at all. However, if the non-vertically directed first borehole sections in the first array of non-vertically directed first borehole sections are longer than a certain length, it may be attractive to deploy stationary seismic receiver arrays that are shorter than the non-vertically directed first borehole sections (for instance to keep the number of seismic receivers in the array within a certain limit). In such cases the stationary seismic receiver array remains in place while the seismic source assembly is moved into a plurality of positions and activated in these positions, after which the entire stationary seismic receiver array is repositioned and then stays fixed while the seismic source assembly is moved into a plurality of other positions and activated in these other positions. In either case, the stationary receiver arrays may be retrievable from the non-vertically directed first borehole sections.

Preferably, the second array of non-vertically directed second borehole sections is made of a plurality of second boreholes, each second borehole comprising a first inclined section and a second inclined section which are connected to each other within the earth formation by a traversing section, whereby the first inclined section connects the earth surface to one end of the traversing section and the second inclined section connects the earth surface to another end of the traversing section, whereby each traversing section comprises one of the non-vertically directed second borehole sections. Herewith it is achieved that the non-vertically directed second borehole sections can easily be accessed from the earth surface via both ends of the non-vertically directed second borehole sections. Such a configuration also facilitates moving the seismic source assembly axially through the first non-vertically directed second borehole section, by pulling the seismic source assembly through the first non-vertically directed second borehole section with a pulling cable that reaches the earth surface through one of the inclined sections. A motor may be located on the earth surface outside the second borehole and connected to the seismic source assembly via the pulling cable for this purpose.

The repeatable seismic source preferably has an emission pattern of said seismic waves which includes a vertical direction. In case the second array of non-vertically directed second borehole sections is substantially horizontally directed, such emission pattern may be referred to as a broadside emission pattern (sometimes referred to as transverse emission pattern). The repeateable seismic source typically has an elongate body, which in use is axially aligned with the axial direction of the second borehole section in which it is deployed.

The first non-vertically directed second borehole section is a preferably a cased borehole section. The casing not only serves to protect the first non-vertically directed second borehole section against collapse, but it also provides a protected surface on which the seismic source assembly can slide or roll through the first non-vertically directed second borehole section.

Other elements that may be employed individually or in combination with other elements from the list to contribute to a reduction of the investment needed to deploy the seismic monitoring system include:

the first and/or second stationary seismic receiver arrays are provided in the form of a broad-side sensitive fiber-optic distributed acoustic sensing cable;

a down-hole sparker source is employed in the seismic source arrangement as the repeatable seismic source.

Broadside sensitivity of fiber-optic distributed acoustic sensing (DAS) cables may be achieved in various ways, including helically winding of a fiber optic DAS cable. Reference is made to an article by Albena Mateeva et al. in Geophysical Prospecting, Vol. 62, pp. 679-692 (2014) with the title "Distributed acoustic sensing for reservoir monitoring with vertical seismic profiling". The article is incorporated herein by reference. The use of broad-side sensitive fiber-optic distributed acoustic sensing cable is much more cost effective than conventional analogue electric detectors, because DAS cables allow for high spatial sampling enabling sparse geometries whilst maintaining illumination. Moreover, a DAS interrogation unit employed to interrogate the fiber-optic DAS cable is a lower-cost instrument than a conventional seismic recording instrument.

Any repeatable downhole source that can emit down-going waves (waves having a transverse propagation direction compared to the axial direction of the non-vertically directed first borehole sections) and that is sufficiently powerful to result in detectable reflected and/or refracted waves in this seismic bandwidth in the stationary seismic receiver arrays can be used. The emitted down-going waves preferably comprise compressional waves. Suitably, the repeatable downhole source covers a seismic frequency bandwidth including at least frequencies between 40 and 150 Hz, preferably between 30 and 150 Hz, and more preferably between 3 and 150 Hz and most preferably between 2 and 150 Hz. If desired the repeatable downhole source may cover frequency ranges extended to frequencies higher than 150 Hz. In such cases the upper limit of any of the ranges mentioned above may, instead of 150 Hz, be 200 Hz, preferably 250 Hz, and most preferably 800 Hz.

One suitable example is the down-hole sparker source. Down-hole sparker sources have been disclosed as being drill-string deployable. Information about down-hole sparker source may be found in numerous public sources. A non-limiting list of examples includes the following references: Baria, R. et al. "Further development of a high-frequency seismic source for use in boreholes" in Geophysical Prospecting, Vol. 37, pp. 31-52 (1989); Rechtien, R. D. et al., "A high-frequency sparker source for the borehole environment: Geophysics, Vol. 58, pp. 660-669 (1993); and W. Heigl et al., "Development of a downhole sparker source with adjustable frequencies", SEG Annual Meeting 2012 Expanded Abstracts. Down-hole sparker sources have been reported to have a time-repeatability of about 50 microseconds, or less than 100 microseconds.

Another repeatable downhole source contemplated for use in this invention is the downhole seismic source promoted by Schlumberger under the trade mark Z-Trac, originally proposed for cross-well imaging. Reference is made to an article (IPTG-16870-MS) with the title "Next Generation Borehole Seismic: Dual-Wavefield Vibrator System" as published in the International Petroleum Technology Conference, 26-28 Mar. 2013 by A. Nalonnil et al., and a patent description in US pre-grant publication No. 2014/0328139. This source produces both direct compressional waves and direct shear waves.

The method disclosed herein may be employed for time lapse surveys. Such time lapse survey may comprise repeating the method by recording seismic signals for a second time (second recording) after a period of time has lapsed since seismic signals have been recorded in the past for a first time (first recording). A time-lapse signal may then be derived reflecting differences between the second recording and the first recording.

The second array of non-vertically directed second borehole sections is preferably vertically separated from the first array of non-vertically directed first borehole sections. In such a configuration, when seen in a vertical projection on a horizontal plane the first non-vertically directed second borehole section can cross the first non-vertically directed first borehole section in a first cross point and the second non-vertically directed first borehole section in a second cross point, whereby the first cross point and the second cross point are separated from each other by a first horizontal distance. When the first receiver location, when seen in said vertical projection, coincides with the first cross point and the second receiver location in said vertical projection coincides with the second cross point, it is possible to do so-called zero offset seismic. This means that the repeatable seismic source is vertically above or below one of the stationary seismic receivers.

The repeatable seismic source does not have to be exactly in vertical alignment with the stationary seismic receivers. When recording shots from a plurality of borehole positions, it is possible to interpolate the source signal to any intermediate position between the first and second positions without aliasing. Preferably, the distance between two adjacent seismic source positions when seen in said vertical projection is less than the first horizontal distance.

The ability to interpolate the source signal to any intermediate position between the first and second positions without aliasing is also advantageous for the purpose of time-lapse seismic signal recording (enabling 4D seismic). The sensitivity for time lapse signals (reflecting minor changes in the earth formation over time) depends on the repeatability of the acquisition, including repeatability of the source signature and of the position of the repeatable seismic source. The ability to interpolate helps to improve the position repeatability. Repeatability of the source itself (source signature) may be improved by repeatedly activating the repeatable seismic source when the seismic source assembly is in the first position and/or in the second position, and whereby recorded shots of seismic signals are stacked so as to reduce influence of shot-to-shot variations caused by repeatability variations of the repeatable seismic source.

Another advantage of the vertical separation between the first array of non-vertically directed first borehole sections and the second array of non-vertically directed second borehole sections is that the vertical separation can be used to identify contributions in the recorded seismic signals from upgoing waves and downgoing waves. To this end it is advantageous to provide a seismic receiver in the non-vertically directed second borehole section. An elegant and advantageous way to achieve this is by employing a seismic source assembly that in addition to the repeatable seismic source further comprises a movable seismic receiver which is sensitive to vertically propagating seismic waves. A separation between the repeatable seismic source and the movable seismic receiver within the seismic source assembly is preferably maintained while moving the seismic source assembly axially through the first non-vertically directed second borehole section, such that in said vertical projection a source-receiver separation distance between said repeatable seismic source and said movable seismic receiver corresponds to the first horizontal distance. Herewith it is achieved that seismic signals may also be recorded with the movable seismic receiver each time that the repeatable seismic source is activated. With this source-receiver separation, it is possible to vertically align both the seismic source and the movable seismic receiver vertically with two stationary seismic receivers. By determining time difference between certain arrivals measured in the movable seismic receiver and the stationary seismic receiver that is in vertical alignment with the movable seismic receiver it can be determined which arrivals correspond to upgoing waves and which arrivals correspond to downgoing waves.

Figure 1:
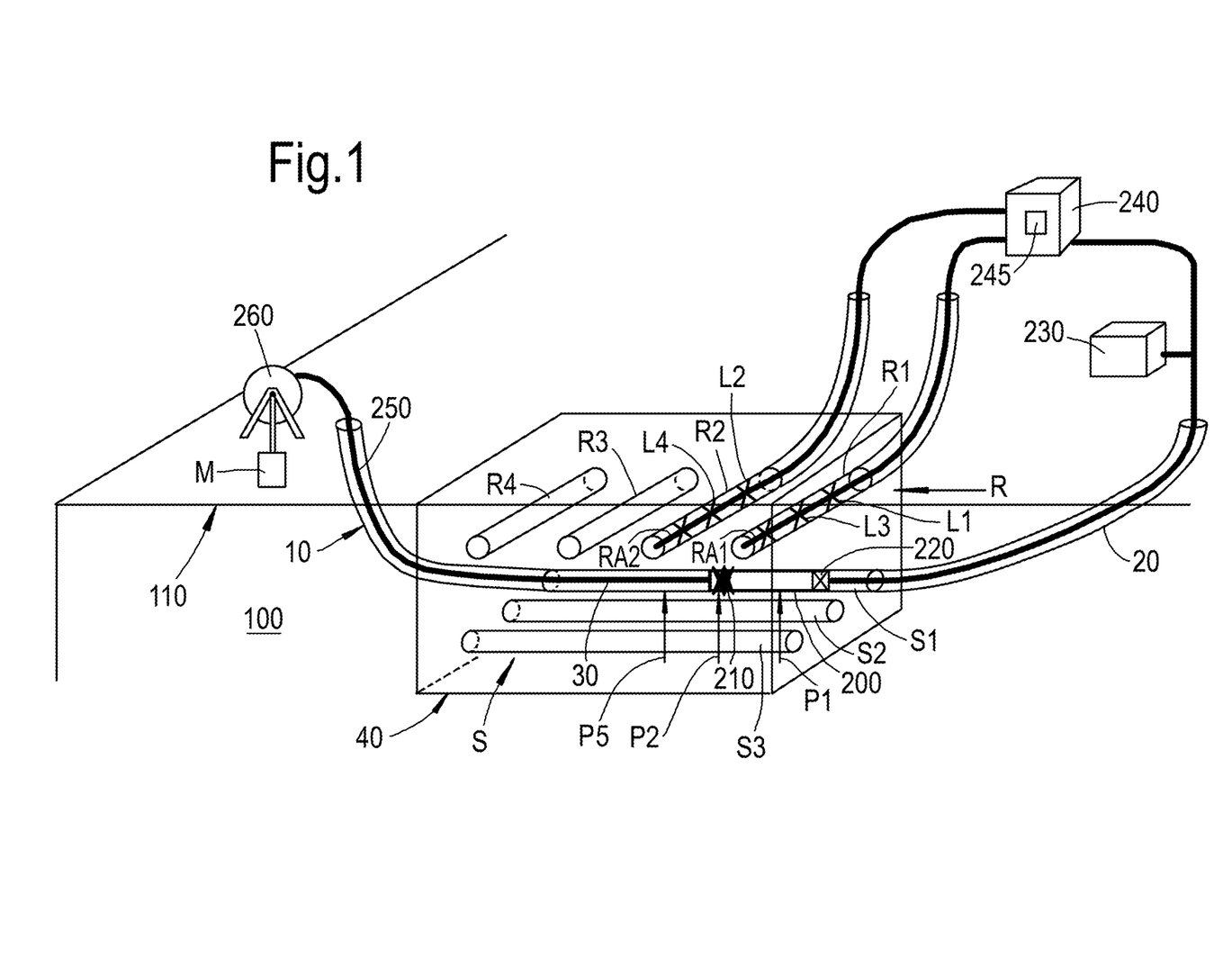
FIG. 1 schematically shows a perspective view of a proposed system for recording seismic signals.

Turning now to the figures, FIG. 1 schematically illustrates a proposed system for recording seismic signals in perspective view. A first array R of non-vertically directed first borehole sections (R1, R2, R3, R4, etc.) is provided in an earth formation 100 beneath an earth surface 110. This first array R comprises at least a first non-vertically directed first borehole section R1 and a second non-vertically directed first borehole section R2, and optionally a third non-vertically directed first borehole section R3, a fourth non-vertically directed first borehole section R4, and optionally even more non-vertically directed first borehole sections (not shown). The first array R of non-vertically directed first borehole sections in said earth formation 100 is preferably provided less deep than 100 m from the earth surface 110 and/or deeper than any seasonally-affected layer, which may be deeper than about 10 m from the earth surface 110.

In addition to the first array R of non-vertically directed first borehole sections, a second array S of non-vertically directed second borehole sections is provided in the earth formation 100. The second array S of non-vertically directed second borehole sections may also be provided less deep than 100 m from the earth surface 110 and/or deeper than any seasonally-affected layer (which may be deeper than 10 m from the earth surface 110). The second array S of non-vertically directed second borehole sections comprises at least a first non-vertically directed second borehole section S1. Optionally, a second non-vertically directed second borehole section S2, or even more non-vertically directed second borehole sections of which a third non-vertically directed second borehole section S3 is depicted in FIG. 1 as an example. The second array S of non-vertically directed second borehole sections is preferably vertically separated from the first array R of non-vertically directed first borehole sections. Suitably, the non-vertically directed first borehole sections in the first array R are all parallel to each other and regularly spaced at a constant borehole-to-borehole separation distance.

A first stationary seismic receiver array RA1 is provided in the first non-vertically directed first borehole section. In FIG. 1, the first stationary seismic receiver array RA1 is represented by a number of x symbols interconnected by a seismic cable. The x symbols represent stationary receivers. The first stationary seismic receiver array RA1 comprises at least one first stationary seismic receiver in a first receiver location L1. A second stationary seismic receiver array RA2 is arranged in the second non-vertically directed first borehole section R2. The second stationary seismic receiver array RA2 comprises at least one second stationary seismic receiver in a second receiver location L2. Each of the first and second stationary seismic receivers should be sensitive to vertically propagating seismic waves.

The first and second stationary seismic receiver arrays may suitably each comprise additional stationary receivers. For example, the first stationary seismic receiver array RA1 may further comprise at least a third stationary seismic receiver in a third receiver location L3. Similarly, the second stationary seismic receiver array RA2 may further comprise a fourth stationary seismic receiver in a fourth receiver location L4.

The seismic receivers may be "point sensors", of which conventional electric seismic receivers, such as geophones or hydrophones, are common examples. Alternatively, the preferred option is to provide the first and second stationary seismic receiver arrays in the form of a broad-side sensitive fiber-optic distributed acoustic sensing cables. In this case the sensors are distributed sensors which are divided in so-called localized detection channels.

A seismic source assembly 200 is provided as well. The seismic source assembly 200 comprises a repeatable seismic source 210. Preferably, the seismic source assembly 200 further comprises a movable seismic receiver 220 in addition to the repeatable seismic source 210. Like stationary seismic receivers, the movable seismic receiver is preferably also sensitive to vertically propagating seismic waves. The function and operation of the movable seismic receiver 220 will be discussed later herein.

A motor M is operably connected to the seismic source assembly 200, for moving the seismic source assembly 200 axially through the first non-vertically directed second borehole section S1 from at least a first position P1 to a second position P2, of a plurality of first borehole positions along a length of the first non-vertically directed second borehole section S1. The plurality of first borehole positions may for instance include a fifth position P5. For schematic purposes in the example shown in FIG. 1, the motor M drivingly engages with a reel 260 on which a pulling cable 250 is wound.

A source controller 230 is connected to the repeatable seismic source 210. The source controller 230 is capable of activating the repeatable seismic source 210 when the seismic source assembly 200 is in the first position P1, and when the seismic source assembly is in the second position P2, or any other position within the first non-vertically directed second borehole section S1 or other position within any other of the non-vertically directed second borehole sections belonging to the second array S of non-vertically directed second borehole sections.

A data recorder 240 is operably connected to the first and second stationary seismic receivers, to record seismic signals from the first and second stationary seismic receivers. The data recorder 240 may comprise a computer readable storage medium 245 which is transportable. Examples include as a magnetic tape, a magnetic disc, an optical disc, a flash memory.

Suitably, the second array S of non-vertically directed second borehole sections is made of a plurality of second boreholes, wherein each second borehole comprises a first inclined section 10 and a second inclined section 20. The first inclined section 10 and the second inclined section 20 may be connected to each other within the earth formation by a traversing section 30. The first inclined section 10 may extend between and connect the earth surface 110 to one end of the traversing section 30; the second inclined section 20 may extend between and connect the earth surface 110 to another end of the traversing section 30. Suitably, each traversing section 30 comprises one of the non-vertically directed second borehole sections. In the example of FIG. 1, the traversing section 30 comprises the first non-vertically directed second borehole section S1. This way, the non-vertically directed second borehole sections may conveniently be accessed from the earth surface 110 to move and operate the seismic source assembly 200. Suitably, a pulling cable 250 is connected to the seismic source assembly 200. The pulling cable 250 suitably reaches the earth surface through one of the inclined sections (for example the first inclined section 10 as shown in FIG. 1).

Figure 2:
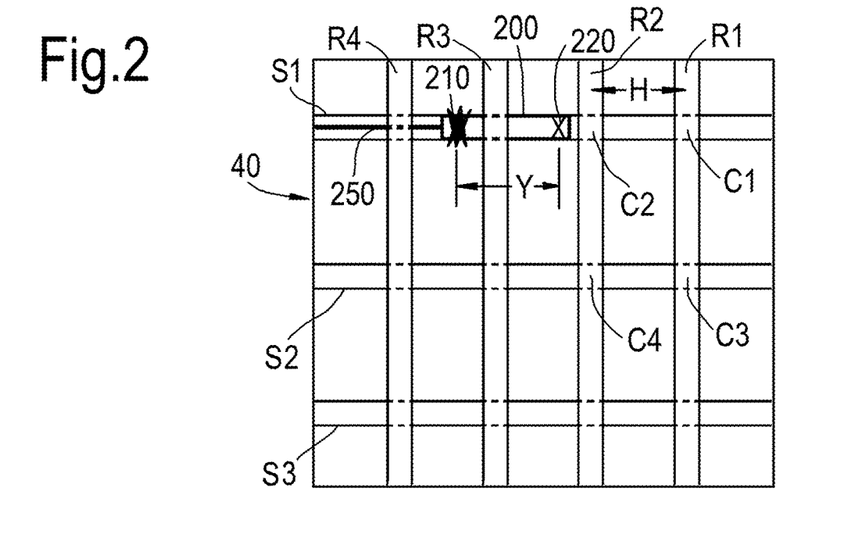
FIG. 2 schematically shows a vertical top view of the proposed system of FIG. 1 on a horizontal plane.

FIG. 2 schematically shows a top view of vertical projections of the non-vertically directed first and second borehole sections of FIG. 1 on a horizontal plane 40. The projections are labeled with the same reference number as the non-vertically directed first and second borehole sections in FIG. 1 because FIG. 2 can simply be considered to be a top view of a segment of FIG. 1. As seen in the vertical projection on the horizontal plane 40, the first non-vertically directed second borehole section S1 crosses the first non-vertically directed first borehole section R1 in a first cross point C1. Vertically projected on the horizontal plane 40, the first non-vertically directed second borehole section S1 crosses the second non-vertically directed first borehole section R2 in a second cross point C2. The first cross point C1 and the second cross point C2 are separated from each other by a first horizontal distance H. The first receiver location L1, seen in the projection of FIG. 2, coincides with the first cross point C1, and the second receiver location L2 coincides with the second cross point C2. It should be noted that the receiver locations itself cannot be seen in FIG. 2; only their vertical projections in the plane shown in FIG. 2 can be seen in this figure. Any third receiver location L3, again seen the vertical projection shown in FIG. 2, is horizontally separated from the first cross point C1, and any fourth receiver location is separated from the second cross point C2. Conveniently, the third receiver location L3, seen the vertical projection shown in FIG. 2, may coincide with a third cross point C3, which is where the second non-vertically directed second borehole section S2 crosses the first non-vertically directed first borehole section R1 when seen in said vertical projection on the horizontal plane 40. Suitably, still seen in said vertical projection of FIG. 2, the first and second non-vertically directed first borehole sections R1 and R2 are parallel to each other. If also the first and second non-vertically directed second borehole sections S1 and S2 are parallel to each other, then the third cross point C3 and the fourth cross point C4 are separated from each other by the same first horizontal distance H as is the case for the first and second cross points C1 and C2.

Figure 3:
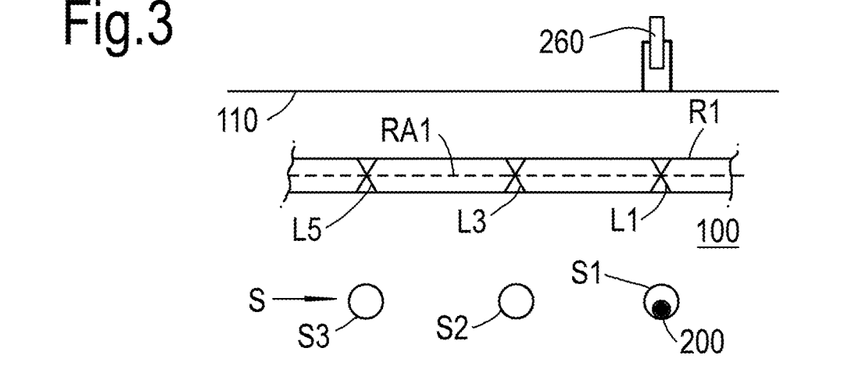
FIG. 3 schematically shows a cross sectional view of the proposed system of FIG. 1 in a plane perpendicular to the non-vertically directed second borehole sections.

FIG. 3 schematically shows a cross sectional view of the proposed system in a plane perpendicular to the non-vertically directed second borehole sections. Underneath the earth surface 110 the first non-vertically directed first borehole section R1 can be seen. In the example shown, the axial direction of the first non-vertically directed first borehole section R1 is parallel to the earth surface 110. Beneath the first non-vertically directed first borehole section R1 are three non-vertically directed second borehole sections S1, S2, S3 of a second array S of non-vertically directed second boreholes. These can be seen in transverse cross section; their axial directions are perpendicular to the plane of view. The seismic source assembly 200 can be seen lying in the first non-vertically directed second borehole section S1. This seismic source assembly 200 is connected to the reel 260 via the pulling cable, which is not in view in this Figure. The first stationary seismic receiver array RA1 is depicted as a helically wound DAS cable disposed within the first non-vertically directed first borehole section RE Receiver locations L1, L3, L5 are indicated vertically above respective first, second, and third non-vertically directed second borehole sections S1, S2, S3.

Figure 4:
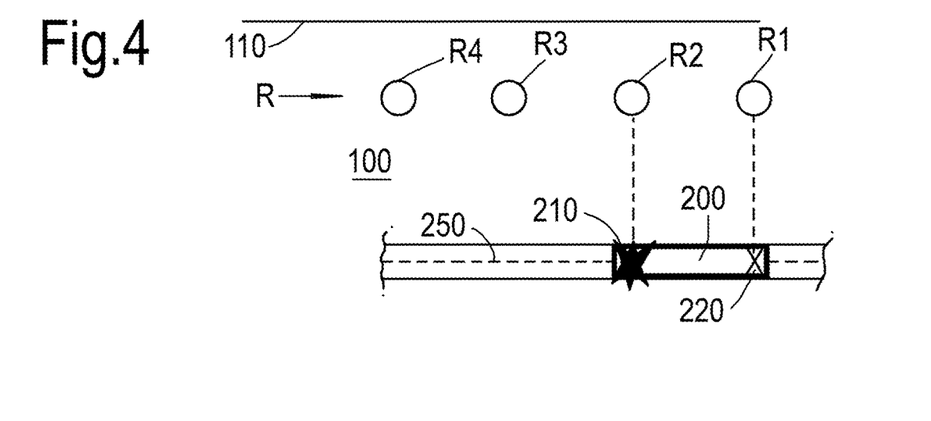
FIG. 4 schematically shows a cross sectional view of the proposed system of FIG. 1 in a plane perpendicular to the non-vertically directed first borehole sections.

FIG. 4 schematically shows a cross sectional view of the proposed system in a plane perpendicular to the non-vertically directed first borehole sections. Underneath the earth surface 110 the first non-vertically directed second borehole section S1 can be seen with the seismic source assembly 200 disposed in it and attached to the pulling cable 250. In this view it can clearly be seen that the seismic source assembly 200 can be aligned with the first array R of non-vertically directed first borehole sections such that the repeatable seismic source 210 is in vertical alignment with one of the non-vertically directed first borehole sections (in this case the second non-vertically directed first borehole section R2) while the movable seismic receiver 220 at the same time is in vertical alignment with another one of the non-vertically directed first borehole sections (in this case the first non-vertically directed first borehole section R1). This enables simultaneous measurement of the outgoing seismic waves in the vertical source-receiver pair between the repeatable seismic source 210 and one of the stationary seismic receivers in the second receiver location L2 and the far-field seismic wave field in a vertical receiver pair comprising one of the stationary seismic receivers in the first receiver location L1 in combination with the movable seismic receiver 220.

The system described above may be operated as follows. The seismic source assembly 200 is moved axially through the first non-vertically directed second borehole section S1, from at least the first position P1 to the second position P2 of the plurality of first borehole positions along the length of the first non-vertically directed second borehole section S1. The repeatable seismic source 210 of the seismic source assembly 200 in the when the seismic source assembly is activated in each of these positions in the plurality of first borehole positions, and shots of seismic signals are recorded with at least each of the first and second stationary seismic receivers. Activating the repeatable seismic source 210 cause's seismic waves to propagate through the earth formation 100. The seismic signals are caused by seismic waves interacting with the (first and second) stationary seismic receivers. The shots of seismic signals are suitably stored on the transportable computer-readable medium 245 in the data recorder 240. Thus, the repeatable seismic source 210 is activated in the first position whereafter a first shot of seismic signals is recorded with at least each of the first and second stationary seismic receivers. Then the repeatable seismic source 210 is moved to the second position where the repeatable seismic source 210 is activated again whereafter a second shot of seismic signals is recorded with at least each of the first and second stationary seismic receivers. The first and second shots of seismic signals may be stored on the transportable computer-readable medium 245.

It will be clear to the person skilled in the art that recording said first shot of seismic signals may further includes seismic signals measured with other stationary seismic receivers from the first stationary seismic receiver array RA1 and from the second stationary seismic receiver array RA2, including said third stationary seismic receiver and said fourth stationary seismic receiver.

Moving of the seismic source assembly 200 may suitably comprise pulling the seismic source assembly 200 through the non-vertically directed second borehole sections, including the first non-vertically directed second borehole section S1, by a pulling cable that reaches the earth surface 110 through one of the inclined sections 10. Preferably the horizontally measured distance between successive positions in the plurality of positions of the seismic source assembly 200 is smaller than the first horizontal distance H. Preferably, seen in the vertical projection of FIG. 2, at least one of the plurality of positions is on one side of a selected cross point while at least another one of the plurality of positions is on the other side of said selected cross point, allowing interpolation to the location of the selected cross point. The closer spaced the consecutive adjacent positions are wherein the seismic source assembly 200 is when the seismic source 210 is activated, the more accurately the origin of the seismic waves can be interpolated to any intermediate position without aliasing. By having the n-th receiver location Ln (n can be replaced by any positive integer number, i.e. 1, 2, 3, etc.) coincide with the n-th cross point Cn, it is possible to achieve a perfect vertical alignment between a shot position of the repeatable seismic source 210 (either physically or by virtue of interpolation) and the n-th receiver location Ln.

Activating the repeatable seismic source 210 when the seismic source assembly 200 is in the first position P1 and/or in the second position P2 comprises repeatedly activating the repeatable seismic source 210 in the first and/or second positions. Recorded shots of seismic signals may be stacked so as to reduce influence of shot-to-shot variations caused by repeatability variations of the repeatable seismic source 210. The repeatability of the wavelet that represents the seismic wave at its origin in the repeatable seismic source 210 is an important parameter for time-lapse imaging. The repeatability of a stacked wavelet is higher than that of an individual wavelet. Hence, if desired, multiple shots can be fired by repeatedly activating the repeatable seismic source 210 without moving the seismic source assembly 200. A sparker source has a sufficiently high shot repetition rate to render this feasible.

If there is a non-zero vertical separation between the first array R of non-vertically directed first borehole sections and the second array S of non-vertically directed second borehole sections, and if there are cross points between non-vertically directed first borehole sections of the first array R and non-vertically directed second borehole sections of the second array S, whereby there are stationary receivers in receiver locations within the non-vertically directed first borehole sections of the first array R vertically above the cross points, it is also possible to create a vertical array of seismic receivers by locating an additional receiver above the cross points in the non-vertically directed second borehole sections of the second array S. This can be used to estimate down-going seismic waves, reflected from the variable near-surface. Signals from such down-going seismic waves are sometimes referred to a receiver ghosts, and it is often desired to remove these receiver ghosts by data processing.

Various techniques for deghosting have been developed. Some of these techniques employ analysis of seismic signals recorded by vertically spaced receiver arrays or receiver pairs. By comparing the timing at which various waves are detected at the sensor arrays, it can be determined which parts of the signals are ghosts and which parts of the signals are caused by primary waves. Reference is made to a paper by Julien Cotton and Eric Forgues titled "Duel-Depth Hydrophones for Ghost Reduction in 4D Land Monitoring" which appeared in SEG Annual Meeting extended abstracts, 2012 (Las Vegas) and US pre-grant publication No. US 2014/0092708.

Reference is also made to co-pending International application No. PCT/US2015/049451, which describes a geometry wherein first and second non-vertical wellbore segments are separated by a distance. Sensors arranged in these first and second wellbore segments intersect a vertical line in the formation. This geometry is proposed to separate upgoing acoustic waves and/or downgoing acoustic waves from a total wave field. The contents of this reference are incorporated herein by reference.

A cost effective way of creating seismic receiver pairs in the system described herein, is by providing a movable seismic receiver 220 in the seismic source assembly 200 at a fixed horizontal separation from the repeatable seismic source 210. The movable seismic receiver 220 should also be sensitive to vertically propagating seismic waves as the seismic waves that need to be detected will come in very near vertical (depending on the source-receiver separation compared to the vertical distance to reflecting layers within the earth formation 100).

Ideally the source-receiver separation would be zero, but as there is no vertical separation between the movable seismic receiver 220 and the repeatable seismic source 210 within the seismic source assembly 100 this is not expected to yield acceptable signals from the movable seismic receiver 2220 due to overloading. A non-zero separation between the repeatable seismic source 210 and the movable seismic receiver 220 may thus be maintained while moving the seismic source assembly 200 axially through the non-vertically directed second borehole sections, such that in the vertical projection of FIG. 2 the source-receiver separation distance Y between the repeatable seismic source 210 and the movable seismic receiver 220 corresponds to the first horizontal distance H defined by the distance between two adjacently neighboring created between one non-vertically directed second borehole section and two adjacently neighboring non-vertically directed first borehole sections. This enables a simultaneous measurement of the outgoing seismic waves in a vertical source-receiver configuration and the far-field seismic wave field in a vertical receiver array comprising one of the stationary seismic receivers in combination with the movable seismic receiver 220. The movable seismic receiver 220 may be towed behind the repeatable seismic source 210, as shown in the example of FIGS. 1 and 2, or vice versa. Optionally, a movable seismic receiver is provided on both sides of the repeatable seismic source 210 in the seismic source assembly 200, in which case two vertical receiver arrays can be formed between movable receivers and stationary receivers, whereby the repeatable seismic source 210 is in vertical alignment with another stationary receiver.

In operation, in addition to the stationary receivers, seismic signals are also recorded with the movable seismic receiver 220 whenever the repeatable seismic source 210 is activated. The data recorder 240 is operably connected to the movable seismic receiver 220 to record seismic signals from the movable seismic receiver 220 caused by said seismic waves interacting with the movable seismic receiver 220. In FIG. 1 the data recorder 240 is illustrated as a single unit. However, the data recorder 240 may actually consist of separate units, for instance whereby each stationary receiver array and/or the movable seismic receiver is connected to individual units.

Suitably, the movable seismic receiver 220 may be provided in the form of a point sensor, such as a hydrophone. A hydrophone is less sensitive to ground roll than some other seismic sensors. Ground roll effects can negatively impact measurements. For instance, it contributes "noise" in time lapse signals. Data matching may be required if the movable seismic receiver 220 is a different type than the stationary receivers. This can be done by the person skilled in the art without undue burden based on common skills. If a fiber-optic distributed acoustic sensing cable is used for the stationary receivers, then a hydrophone is a particularly suitable choice for the movable seismic receiver, because a hydrophone responds much more like a fiber-optic distributed acoustic sensing cable than direction-sensitive devices such as for instance a geophone or an accelerometer. The similarity makes it easier to form the (vertical) seismic receiver pairs.

The proposed seismic source assembly 200 is retrievable from the first non-vertically directed second borehole section S1. Thus, after a plurality of shots have been recorded at various positions in the plurality of positions of the seismic source assembly 200 within the first non-vertically directed second borehole section S1, the seismic source assembly 200 may be retrieved from the first non-vertically directed second borehole section S1 and re-deployed in, for instance, the second non-vertically directed second borehole section S2. The seismic source assembly 200 may then be moved axially through the second non-vertically directed second borehole section S2 from at least a third position to a fourth position of a plurality of second borehole positions along a length of the second non-vertically directed second borehole section S2. As before, the repeatable seismic source 210 may be activated when the seismic source assembly is in the third position, and a third shot of seismic signals may be recorded with at least each of the third and fourth stationary seismic receivers. After moving the seismic source assembly 200 to the fourth position, the repeatable seismic source 210 may be activated when the seismic source assembly 200 is in the fourth position and a fourth shot of seismic signals may be recorded with at least each of the third and fourth stationary seismic receivers.

Suitably the vertical separation distance between each non-vertically directed first borehole section and each non-vertically directed second borehole section in the first and second arrays (R,S) vertically above each of the cross points is the same. This results in the same vertical separation between each of stationary seismic receivers and the movable seismic receiver 220 when they are in vertical alignment, which makes it easier to process the seismic data. However, this is not a necessity for the purpose of identifying signals caused by upgoing and downgoing waves as long as each vertical separation is known.

In the examples shown, non-vertically directed first borehole sections and the non-vertically directed second borehole sections in the first and second arrays (R,S) are horizontally directed (parallel to the earth surface). It will be understood that (slightly) undulating or tilted orientations can also be employed. However, the most advantageous embodiments require cross points to exist between the first non-vertically directed second borehole section and the first non-vertically directed first borehole section and between the first non-vertically directed second borehole section and the second non-vertically directed first borehole section, when seen in a vertical projection on a horizontal plane, so that there are locations and positions within these non-vertically directed first and second borehole sections that are in a vertical alignment with each other.

Preferably, the vertical projection of the first non-vertically directed second borehole section has an orthogonal component to each of the vertical projections of the first non-vertically directed first borehole section and the second non-vertically directed first borehole section. More preferably, the vertical projections of the first non-vertically directed first borehole sections deviate less than 45° from orthogonal to the vertical projection of the first non-vertically directed second borehole section. Most preferably, the vertical projection of the first non-vertically directed second borehole section is orthogonal to each of the vertical projections of the first non-vertically directed first borehole sections and the second non-vertically directed first borehole section.

In the example above, the first array R of non-vertically directed first borehole sections is configured less deep than the second array S of non-vertically directed second borehole sections. Technically it may also be reversed. The main consideration driving the decision may be cost and/or operational convenience.

The person skilled in the art will understand that the present invention can be carried out in many various ways without departing from the scope of the appended claims.

The invention claimed is:

1. A method of recording seismic signals, comprising the steps of:
    providing a first array of non-vertically directed first borehole sections in an earth formation beneath an earth surface, comprising at least a first non-vertically directed first borehole section and a second non-vertically directed first borehole section;
    providing a second array of non-vertically directed second borehole sections in said earth formation, comprising at least a first non-vertically directed second borehole section, wherein the second array of non-vertically directed second borehole sections is vertically separated from the first array of non-vertically directed first borehole sections, whereby seen in a vertical projection on a horizontal plane the first non-vertically directed second borehole section crosses the first non-vertically directed first borehole section in a first cross point and the second non-vertically directed first borehole section in a second cross point, whereby the first cross point and the second cross point are separated from each other by a first horizontal distance;
    providing a first stationary seismic receiver array in the first non-vertically directed first borehole section, comprising at least one first stationary seismic receiver in a first receiver location, and providing a second stationary seismic receiver array in the second non-vertically directed first borehole section comprising at least one second stationary seismic receiver in a second receiver location;
    providing a seismic source assembly comprising a repeatable seismic source;
    moving the seismic source assembly axially through the first non-vertically directed second borehole section from at least a first position to a second position of a plurality of first borehole positions along a length of the first non-vertically directed second borehole section;
    activating the repeatable seismic source when the seismic source assembly is in the first position and recording a first shot of seismic signals with at least each of the first and second stationary seismic receivers; and
    activating the repeatable seismic source when the seismic source assembly is in the second position and recording a second shot of seismic signals with at least each of the first and second stationary seismic receivers;
    wherein activating the repeatable seismic source causes seismic waves to propagate through the earth formation and wherein each of the first and second stationary seismic receivers is sensitive to vertically propagating seismic waves and wherein the first and second shots of seismic signals are measured representations of said seismic waves interacting with the first and second stationary seismic receivers, wherein, in said vertical projection, the first receiver location coincides with the first cross point and the second receiver location coincides with the second cross point.

2. The method of claim 1, wherein the second array of non-vertically directed second borehole sections is made of a plurality of second boreholes, each second borehole comprising a first inclined section and a second inclined section which are connected to each other within the earth formation by a traversing section, whereby the first inclined section connects the earth surface to one end of the traversing section and the second inclined section connects the earth surface to another end of the traversing section, whereby each traversing section comprises one of the non-vertically directed second borehole sections.

3. The method of claim 2, wherein moving the seismic source assembly axially through the first non-vertically directed second borehole section comprising pulling the seismic source assembly through the first non-vertically directed second borehole section by a pulling cable that reaches the earth surface through one of the first inclined section and the second inclined section.

4. The method of claim 1, wherein at least the first non-vertically directed second borehole section is a cased borehole section.

5. The method of claim 1, wherein the repeatable seismic source has an emission pattern of said seismic waves which includes a vertical direction.

6. The method of claim 1, wherein the repeatable seismic source is provided in the form of a sparker source.

7. The method of claim 1, wherein the first and second stationary seismic receiver arrays are each provided in the form of a broad-side sensitive fiber-optic distributed acoustic sensing cable.

8. The method of claim 1, wherein activating the repeatable seismic source when the seismic source assembly is in the first position and/or in the second position comprises repeatedly activating said repeatable seismic source in said first and/or second position and wherein recorded shots of seismic signals are stacked so as to reduce influence of shot-to-shot variations caused by repeatability variations of the repeatable seismic source.

9. The method of claim 1, further comprising:
    storing the first and second shots of seismic signals on a transportable computer-readable medium.

10. The method of claim 1, wherein in said vertical projection the first and second positions are separated from each other by less than the first horizontal distance.

11. The method of claim 1, wherein the first stationary seismic receiver array further comprises at least a third stationary seismic receiver in a third receiver location, which in said vertical projection is horizontally separated from the first cross point, and wherein the second stationary seismic receiver array further comprises a fourth stationary seismic receiver in a fourth receiver location, which in said vertical projection is horizontally separated from the second cross point; wherein recording said first shot of seismic signals further includes seismic signals measured with other stationary seismic receivers from the first stationary seismic receiver array and from the second stationary seismic receiver array, including said third stationary seismic receiver and said fourth stationary seismic receiver.

12. The method of claim 11, whereby seen in said vertical projection the first and second non-vertically directed first borehole sections are parallel to each other, and wherein said second array of non-vertically second borehole sections comprises a second non-vertically directed second borehole section, whereby seen in said vertical projection the second non-vertically directed second borehole section crosses the first non-vertically directed first borehole section in a third cross point and the second non-vertically directed first borehole section in a fourth cross point, whereby the third cross point and the fourth cross point are separated from each other by said first horizontal distance; further comprising:

moving the seismic source assembly axially through the second non-vertically directed second borehole section from at least a third position to a fourth position of a plurality of second borehole positions along a length of the second non-vertically directed second borehole section;

activating the repeatable seismic source when the seismic source assembly is in the third position and recording a third shot of seismic signals with at least each of the third and fourth stationary seismic receivers; and activating the repeatable seismic source when the seismic source assembly is in the fourth position and recording a fourth shot of seismic signals with at least each of the third and fourth stationary seismic receivers.

13. The method of claim 1, wherein, in addition to the repeatable seismic source, the seismic source assembly further comprises a movable seismic receiver, wherein the movable seismic receiver is sensitive to vertically propagating seismic waves; and wherein maintaining a fixed separation between said repeatable seismic source and said movable seismic receiver while moving the seismic source assembly axially through the first non-vertically directed second borehole section, such that in said vertical projection a source-receiver separation distance between said repeatable seismic source and said movable seismic receiver corresponds to said first horizontal distance; and wherein seismic signals are also recorded with the movable seismic receiver when the repeatable seismic source is activated while the seismic source assembly is in said first position and when the repeatable seismic source is activated when the seismic source assembly is in said second position.

14. The method of claim 13, wherein further maintaining said separation between said repeatable seismic source and said movable seismic receiver while moving the seismic source assembly axially through the second non-vertically directed second borehole section, such that in said vertical projection the source-receiver separation distance corresponds to said first horizontal distance; and wherein seismic signals are also recorded with the movable seismic receiver when the repeatable seismic source is activated while the seismic source assembly is in a third position and when the repeatable seismic source is activated while the seismic source assembly is in a fourth position.

15. The method of claim 13, wherein the movable seismic receiver is provided in the form of a hydrophone.

16. The method of claim 1, wherein the first array of non-vertically directed first borehole sections in said earth formation is provided less deep than 100 m from the earth surface and/or below any seasonally affected layer.

17. The method of claim 1 further comprising recording a plurality of first seismic signals in accordance with the method of claim 1 thereby producing a first recording, and further comprising creating a time lapse seismic survey after a period of time has lapsed and recording a plurality of second seismic signals in accordance with the method of claim 1 thereby producing a second recording, and deriving a time-lapse signal reflecting differences between the second recording and the first recording.

18. A system for recording seismic signals, comprising:
a first array of non-vertically directed first borehole sections in an earth formation beneath an earth surface, comprising at least a first non-vertically directed first borehole section and a second non-vertically directed first borehole section;

a second array of non-vertically directed second borehole sections in said earth formation, comprising at least a first non-vertically directed second borehole section, wherein the second array of non-vertically directed second borehole sections is vertically separated from the first array of non-vertically directed first borehole sections, whereby seen in a vertical projection on a horizontal plane the first non-vertically directed second borehole section crosses the first non-vertically directed first borehole section in a first cross point and the second non-vertically directed first borehole section in a second cross point, whereby the first cross point and the second cross point are separated from each other by a first horizontal distance;

a first stationary seismic receiver array in the first non-vertically directed first borehole section, comprising at least one first stationary seismic receiver in a first receiver location, and a second stationary seismic receiver array in the second non-vertically directed first borehole section comprising at least one second stationary seismic receiver in a second receiver location;

a seismic source assembly comprising a repeatable seismic source;

a motor operably connected to the seismic source assembly for moving the seismic source assembly axially through the first non-vertically directed second borehole section from at least a first position to a second position of a plurality of first borehole positions along a length of the first non-vertically directed second borehole section;

a source controller capable of activating the repeatable seismic source when the seismic source assembly is in the first position and when the seismic source assembly is in the second position; and a data recorder operably connected to the first and second stationary seismic receivers to record seismic signals from the first and second stationary seismic receivers;

wherein activating the repeatable seismic source causes seismic waves to propagate through the earth formation and wherein each of the first and second stationary seismic receivers is sensitive to vertically propagating seismic waves whereby said seismic signals are caused by said seismic waves interacting with the first and second stationary seismic receivers, wherein, seen in said vertical projection, the first receiver location coincides with the first cross point and the second receiver location coincides with the second cross point.

19. The system of claim 18, whereby seen in said vertical projection the first and second non-vertically directed first borehole sections are parallel to each other, and wherein, in addition to the repeatable seismic source, the seismic source assembly further comprises a movable seismic receiver, wherein the movable seismic receiver is sensitive to vertically propagating seismic waves; and wherein a separation between said repeatable seismic source and said movable seismic receiver is maintained while moving the seismic source assembly axially through the first non-vertically directed second borehole section, such that in said vertical projection a source-receiver separation distance between said repeatable seismic source and said movable seismic receiver corresponds to said first horizontal distance; and wherein seismic signals are also recorded with the movable seismic receiver when the repeatable seismic source is activated; and wherein said data recorder is operably connected to movable seismic receiver to record seismic signals from the movable seismic receivers caused by said seismic waves interacting with the movable seismic receiver.

* * * * *